United States Patent
Talbi et al.

(10) Patent No.: US 6,984,172 B2
(45) Date of Patent: Jan. 10, 2006

(54) DUAL POWER PATH DRIVE FOR A ROTATING THRESHING ROTOR OF AN AGRICULTURAL COMBINE AND METHOD FOR DECELERATING THE ROTOR

(75) Inventors: Aziz Talbi, Davenport, IA (US); Yun-Ren Ho, Naperville, IL (US); John G. Brome, Delavan, WI (US)

(73) Assignee: CNH America LLC, Racine, WI (US)

( * ) Notice: Subject to any disclaimer, the term of this patent is extended or adjusted under 35 U.S.C. 154(b) by 183 days.

(21) Appl. No.: 10/756,857

(22) Filed: Jan. 14, 2004

(65) Prior Publication Data

US 2005/0172593 A1   Aug. 11, 2005

(51) Int. Cl.
*F26B 25/22* (2006.01)

(52) U.S. Cl. .......................... 460/59; 475/72
(58) Field of Classification Search ................ 460/59, 460/6; 56/10.3; 475/72, 76, 78, 79
See application file for complete search history.

(56) References Cited

U.S. PATENT DOCUMENTS

| | | | |
|---|---|---|---|
| 4,348,855 A | 9/1982 | DePauw et al. ............... 460/1 |
| 4,376,298 A | 3/1983 | Sokol et al. .................. 701/34 |
| 4,487,002 A | 12/1984 | Krutz et al. ................... 460/6 |
| 4,527,241 A | 7/1985 | Sheehan et al. ............. 701/50 |
| 5,488,817 A | 2/1996 | Paquet et al. ............. 56/10.2 R |
| 5,527,218 A | 6/1996 | Van den Bossche et al. . 460/20 |
| 5,873,227 A | 2/1999 | Arner ......................... 56/14.6 |
| 5,947,818 A | 9/1999 | Satzler .......................... 460/6 |
| 6,052,978 A | 4/2000 | Kempf |
| 6,105,353 A | 8/2000 | Mohr et al. |
| 6,119,442 A | 9/2000 | Hale ....................... 56/10.2 H |
| 6,247,295 B1 | 6/2001 | Hansen et al. |
| RE37,458 E * | 11/2001 | Horsch ........................ 475/72 |
| 6,430,904 B1 | 8/2002 | Coers ......................... 56/10.3 |
| 6,475,081 B2 | 11/2002 | Coers et al. ................. 460/17 |
| 6,663,525 B1 | 12/2003 | McKee et al. |
| 6,702,666 B2 | 3/2004 | Ho et al. |

FOREIGN PATENT DOCUMENTS

| EP | 1 072 817 A1 | 1/2001 |
|---|---|---|
| EP | 1 371 279 A1 | 12/2003 |

* cited by examiner

*Primary Examiner*—Meredith Petravick
(74) *Attorney, Agent, or Firm*—Brant T. Maurer; Rebecca Henkel

(57) ABSTRACT

A dual power path drive and method for controllably decelerating the rotor or rotors of an agricultural combine in reduced time, without causing undesirable wear, shock and energy transfer to other aspects of the power system of the combine. The drive and method use a planetary gear arrangement having an output connected to the rotor or rotors, an input connected to an output of a first power source or path which can be a fluid power source such as a fluid motor of a hydro-static drive or a variable speed electrical motor, the first power source or path being controllable within speed limits thereof for decelerating the rotor from several operating states.

24 Claims, 2 Drawing Sheets

DUAL POWER PATH DRIVE FOR A ROTATING THRESHING ROTOR OF AN AGRICULTURAL COMBINE AND METHOD FOR DECELERATING THE ROTOR

TECHNICAL FIELD

This invention relates generally to a dual power path drive for a rotatable threshing rotor or rotors of an agricultural combine, and more particularly, to a dual path drive such as a hydro-mechanical drive, and a method of operation thereof for controllably decelerating the rotor after a control command to disengage the rotor is received.

BACKGROUND ART

Currently, it is sought to use a dual path drive for rotatably driving rotatable elements of an agricultural combine, particularly a rotatable rotor or rotors of a threshing mechanism of the combine. Such rotors are typically relatively heavy members and are rotated at relatively high speeds, such that in the event that the drive is disengaged therefrom, for instance, as a result of being intentionally controllably disengaged by an operator, or automatically disengaged, such as when a sensor indicates that the operator has left the operator seat, it is typical practice to maintain the drive in a disengaged state to allow the rotor or rotors to rotate freely and decelerate until the stored rotational energy therein is dissipated and the rotation comes to a halt. This can take a relatively long time, depending on damping and inertia acting on the rotating elements. When the rotation has come to a halt, the drive is typically then reengaged with the rotatable element to bring them back to the desired rotating condition.

By use of a dual path drive, that is, a drive such as a hydro-mechanical drive having an input which receives power from a fluid power source such as a fluid motor and another input which receives power from a mechanical power source such as a gear box connected to an engine, or an electromechanical drive, which differs from a hydro-mechanical drive in that an electrical motor is used instead of a fluid motor, it is sought to provide the operating capability to more controllably and quickly decelerate the rotor or rotors, such that time delays while waiting for the rotor or rotors to stop rotating are reduced, without causing undesirable wear of elements and components of the drive, particularly, clutches thereof, and also without potentially damaging shock and sudden transfer of energy of the rotor or rotors to other aspects of the power transmission system so as to affect or disrupt the operation of the system.

SUMMARY OF THE INVENTION

According to the present invention, a dual power path drive operable for rotatably driving a threshing rotor or rotors of an agricultural combine, and more particularly for controllably decelerating the rotor or rotors in a reduced time, without causing undesirable wear, shock and energy transfer to other aspects of the power system of the machine, is disclosed. The drive includes a planetary gear arrangement having an output connected to the rotor or rotors for rotation therewith, a rotatable input connected in rotatably driven relation to a rotatable output of a first power source or path which is preferably a fluid power source such as a fluid motor of a hydro-static drive conventionally controllably operable for variably rotating the output of the fluid motor, or a conventionally controllably variable speed electrical motor. The gear arrangement includes a second input, which is preferably the ring gear thereof, connectable by engagement or operation of a suitable device such as an engine-to-ring clutch, in rotatably driven relation to a rotatable output of a second power source or path connected to an engine of the combine. The device or clutch preferably includes faces or other elements connected in rotatably driven relation to the engine and to the ring gear or other input for rotation therewith, respectively, which faces or other elements can be commanded to slip one relative to the other, that is, brought into relation one to the other such that rotation of one can cause rotation of the other at some proportional speed to the one, or commanded to fully engage such that one will rotate the other at substantially the same speed. A device is also provided for holding the second input or ring gear in a non-rotating state. This device is preferably a ring-to-frame clutch or brake which also includes faces or other elements connected to the ring gear or other input for rotation therewith and to a fixed member or frame of the machine, respectively, which faces or other elements can be commanded to slip one relative to the other, that is, brought into relation one to the other such that a braking effort can be imparted to the second input, or commanded to fully engage such that the second input can be brought to a stop and held so as not to rotate.

The method of the invention for decelerating the rotor or rotors, includes the essential steps of;

(a) determining a rotational speed of the first power source or path and the first input for bringing the second input or ring gear to a rotational speed of zero or another low value;

(b) controlling the first power source or path to rotate the first input at the determined speed;

(c) engaging or operating the device for holding the second input or ring gear in a non-rotating state; then (d) controlling the first powers source or path to rotate the first input to bring the rotor or rotors to zero or another predetermined low value.

If, when the command to decelerate the rotor or rotors is received, the drive is in a state wherein the rotor or rotors is/are being accelerated by slipping connection of the second input or ring gear via the device such as an engine-to-ring clutch in rotatably driven relation to the rotatable output of the second power source or path connected to the engine of the combine, the method of the invention will include a preliminary step of disengaging or disconnecting that device, and, if necessary, allowing the rotor or rotors to passively decelerate to a speed wherein step (a) above can be effected. Additionally, if the second input or ring gear is solidly or non-slippingly connected via the device such as an engine-to-ring clutch in rotatably driven relation to the rotatable output of the second power source or path connected to the engine of the combine such that the rotor or rotors are completing acceleration or are in a run state, the first power source can be first controlled to rotate the first input in a manner to decelerate the rotor or rotors before the engine-to-ring clutch is disengaged.

DETAILED DESCRIPTION OF THE INVENTION

Figure 1:
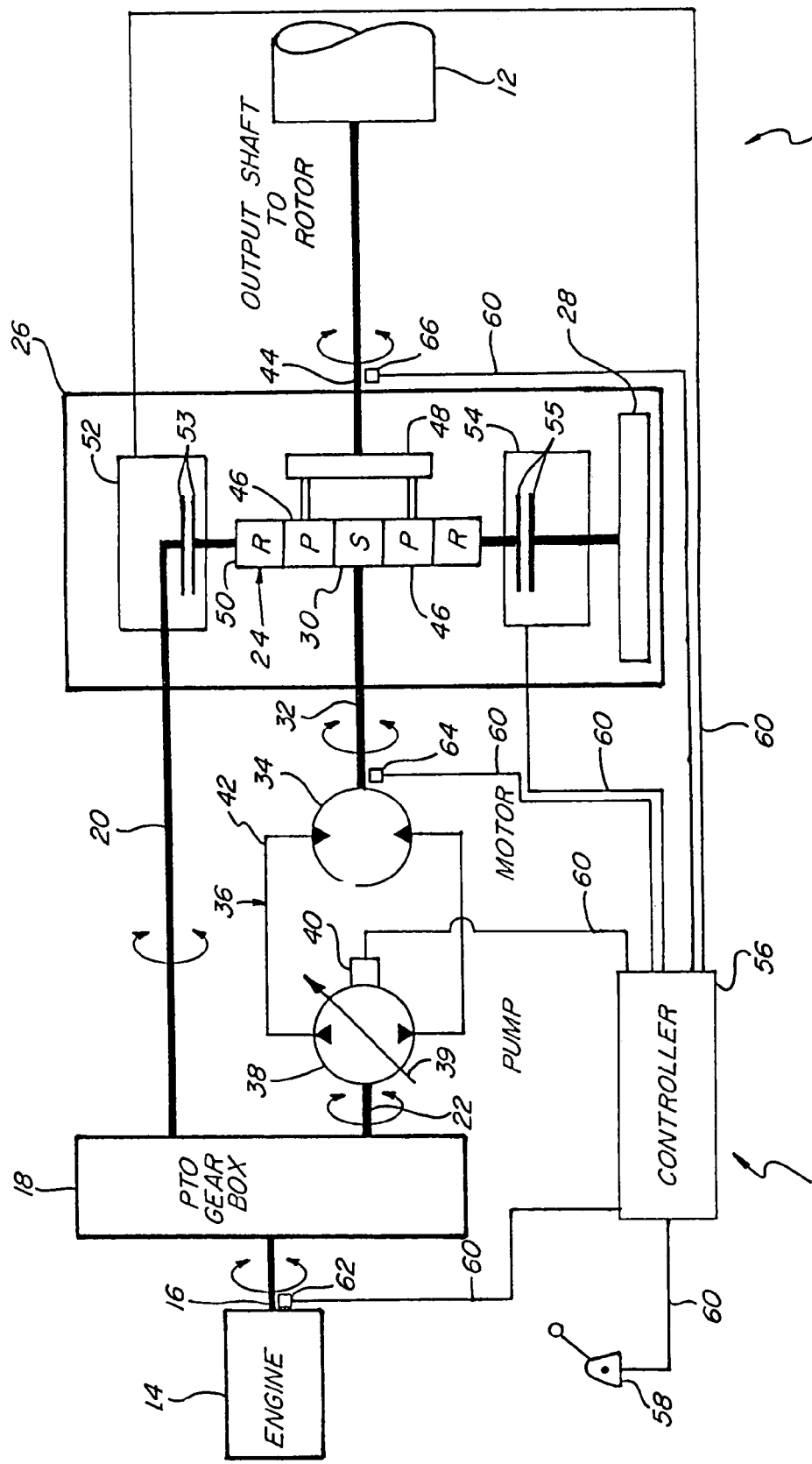
FIG. 1 is a simplified schematic representation of a dual path drive, which is a preferred hydro-mechanical drive, for a rotor or rotors of an agricultural combine, constructed and operable according to the present invention for decelerating the rotor or rotors thereof when rotating.

Referring now to the drawings, in FIG. 1, a schematic representation of a preferred dual path drive 8 for an agricultural combine 10, drive 8 being constructed and operable according to the present invention for decelerating a rotating rotor or rotors 12 of a threshing mechanism of the combine, is shown. Combine 10 includes an engine 14 rotatably drivingly connected by an output 16 to a PTO gear box 18 for transmitting power to drive 8. Gear box 18 includes rotatable outputs 20 and 22 for connection to elements of drive 8.

The preferred drive 8 is a hydro-mechanical drive which includes a planetary gear arrangement 24 conventionally supported and contained in a gear box 26 which contains and fixedly supports or is connected to a fixed frame 28. Gear arrangement 24 includes a first rotatable input 30 which is preferably a sun gear thereof, denoted at S, connected to a rotatable output 32 of a first power path or source which is preferably a fluid motor 34 of a hydrostatic drive 36. Hydrostatic drive 36 also includes a variable displacement fluid pump 38 connected in rotatably driven relation to output 22 of gear box 18, and including an internal swash plate 39 controllable moveable by a control 40 to at least one positive position (+) displaced from a zero position such that when output 22 is rotated, pressurized fluid will be pumped by pump 38 along a fluid path 42 through motor 34 for drivingly rotating output 32 thereof in a first direction in the conventional well known manner. Swash plate 39 of pump 38 is also displaceable in an opposite or negative direction (−), for rotating output 32 of motor 34 in the opposite direction. Such displacement of pump 38 will also be referred to as positive and negative pump swash, respectively. Arrangement 24 includes a rotatable output 44 preferably including a plurality of planet gears 46, denoted at P, enmeshed with sun gear S of input 30, planet gears 46 being mounted for rotation on a carrier 48. Gear arrangement 24 includes a second rotatable input 50 which preferably includes ring gear R which extends around and is enmeshed with planet gears 46. Second rotatable input 50 is rotatably connectable to output 20 of gear box 18, by operation or engagement of a suitable engageable device such as a conventional engine-to-ring clutch 52 including engageable faces 53 connected to output 20 and to ring R for rotation therewith, respectively, or another comparable slippable, selectably engageable device. Second rotatable input 50 is also connectable to fixed frame 28, by operation or engagement of a suitable device such as a conventional ring-to-frame clutch 54 including engageable faces 55 connected to ring R for rotation therewith and to frame 28, respectively. Under normal operating conditions, clutches 52 and 54 are operable or engageable for controlling rotation of second input 50 as first input 30 is rotated at a constant or variable speed as controlled by the swash of fluid pump 38, for controllably rotating output 44, and thus rotor or rotors 12, for performing a desired threshing function. Here, it should be noted that an additional multiple ratio gear box (not shown) can optionally be connected between output 44 and rotor or rotors 12, to enable selecting a ratio of rotation of the rotor or rotors 12 to output 44, as desired.

Control or command of engagement and disengagement of clutches 52 and 54 and displacement of fluid pump 38, respectively, can be accomplished by any suitable controller or controllers as represented by a controller 56. Controller 56 can include one or more fluid valves and/or microprocessors, and is controllable by, or receives input commands from, another controller, a CAN message, or an operator input, such as a control lever or handle, a switch, or the like, as represented by lever 58. In regard to clutches 52 and 54, controller 56 is operable for commanding each to operate in a slipping mode, that is, moving faces 53 or 55 thereof sufficiently close together as at least one of the faces is rotated, such that the rotated face 53 or 55 can effect a desired proportional rotation of the other face 53 or 55, such as a matching or near matching rotational speed, or a nonrotating or slower rotating face 53 or 55 can slow rotation of the other face 53 or 55, by viscous action of fluid disposed between the faces, or by pressure applied for bringing the faces together. Controller 56 is also operable for commanding each clutch 52 and 54 to fully engage, such that the faces 53 of clutch 52 are brought together such that a driven one of the faces will drivingly rotate the other at substantially the same speed, and such that a rotatable face 55 of clutch 54 can be brought together with the nonrotating face 55 to at least substantially stop or prevent rotation of the rotatable face 55. Controller 56 can be connected to control 40 of pump 38, clutches 52 and 54, and lever 58 in any suitable conventional manner, such as by one or more fluid control lines, conductive paths or the like, as represented by lines 60 as shown, for receiving input signals from lever 58, communicating control signals to control 40 and clutches 52 and 54, and for receiving feedback and other information therefrom, such as, but not limited to, swash position information, clutch coil current information, and the like, in the conventional, well known manner. Controller 56 is additionally connected to an engine speed sensor 62 by a conductive path represented by a line 60 for receiving information representative of a rotation speed of output 16; to a speed sensor 64 by a conductive path represented by a line 60 for receiving information representative of a rotational speed of output 32 of fluid motor 34; and to a speed sensor 66 by a conductive path represented by another line 60 for receiving information representative of a rotation speed of output 44 and rotor 12.

As noted above, from time to time, controller 56 will receive a command to disengage drive 8 from rotatably driving rotating output 44 and thus from rotor or rotors 12 connected thereto, either manually by the operator, or automatically, for instance, by operation of a safety device, such as an operator seat sensor or the like. In the past, disengagement typically entailed disengagement of engine-to-ring clutch 52 and zeroing of the angle of swash plate 39 and thus the displacement or swash of fluid pump 38, thereby allowing output 44 and rotor or rotors 12 to freely rotate until rotational energy thereof is dissipated and rotor or rotors 12 come to a stop. The time for the rotor or rotors to come to a stop will vary depending on a number of conditions, but typically can be on the order of two minutes or so. As a result, it is desirable to have a method of operation of drive 8 for decelerating rotor or rotors 12 in a manner so as to minimize this time period. According to the present method, several approaches are contemplated for decelerating one or more rotating rotors 12 of a dual power path drive such as hydro-mechanical drive 8, by the combined application of hydro-mechanical, hydrostatic, and passive means, as a function of the operating states and rotor speed at the time the rotor is disengaged. As an essential step to each approach, the rotor or rotors 12 are decelerated by generating resistance to the rotation by positioning the swash plate at an angle that would result in the planetary ring speed to be zero, or some other selected low value, such that ringto-frame clutch 54 can be engaged, and then controlling motor 34 to bring the rotor speed down to zero or some other selected low value.

In this regard, the operating state of a dual path drive such as drive 8 will typically fall within one of the three following categories;

A) a state including a speed range which can be achieved by hydrostatic drive 36 alone (hereinafter also referred to as the hydrostatic speed range or hydro state);

B) a state including a speed range wherein clutch 52 is slipping and rotor or rotors 12 are accelerating; and C) a state including a speed range wherein clutch 52 is fully engaged and rotor or rotors 12 are completing acceleration or are in a run state. Operating states A and B can overlap, as can states B and C.

Figure 2:
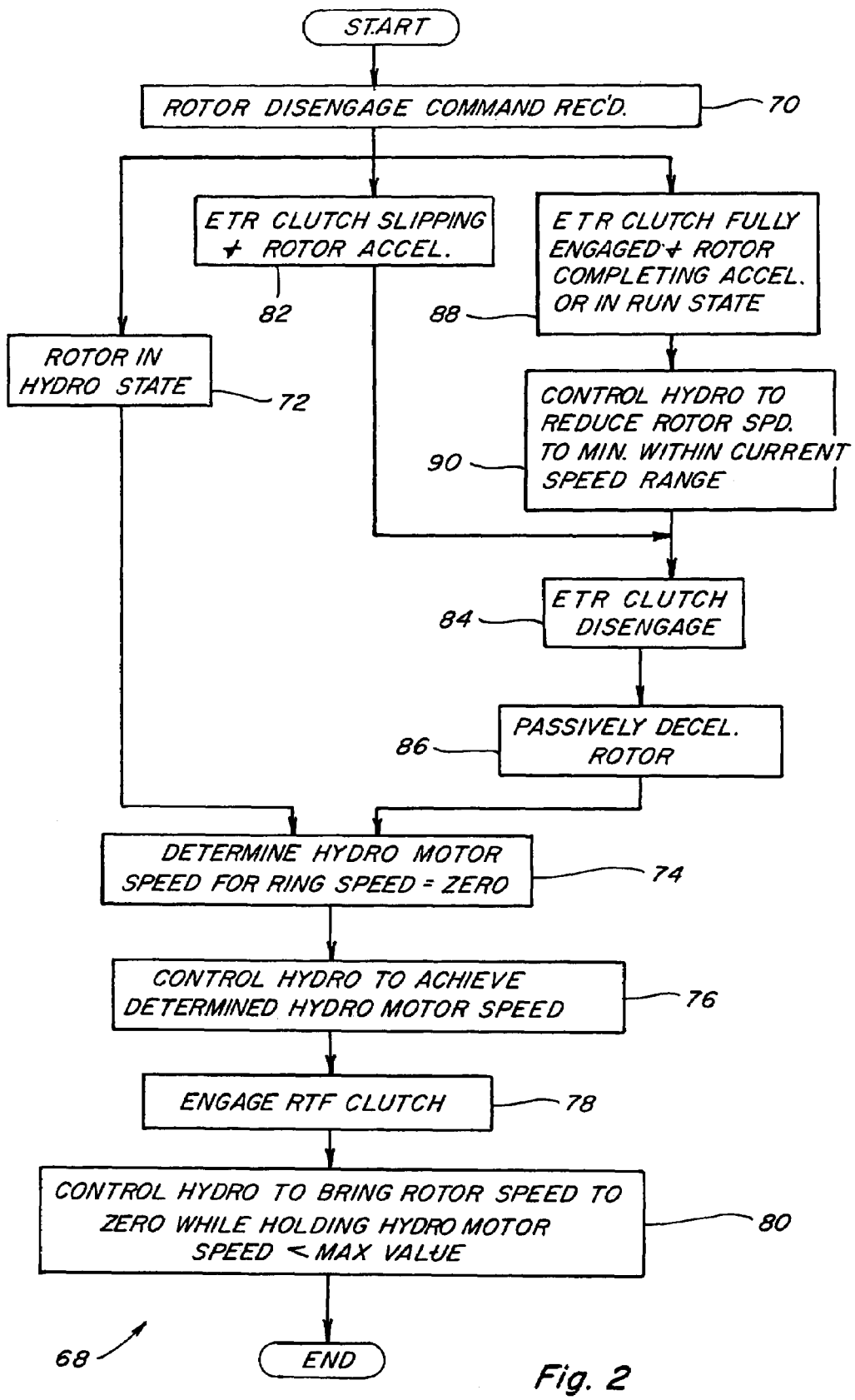
FIG. 2 is a simplified flow diagram showing steps of one approach of the method of the invention.

Referring also to FIG. 2, a high level flow diagram 68 is shown including steps of the method according to the invention for decelerating rotor or rotors 12. In diagram 68, a rotor disengage command is received by controller 56 as denoted at block 70. If the drive is in the hydro state as denoted at block 72, which is a lower speed state with engine-to-ring clutch 52 disengaged, controller 56 will determine a speed of output 32 of motor 34 connected to sun gear S of input 30 for bringing the speed of ring R to zero or another low value suitable for engaging clutch 54 without undue shock or energy transfer, as denoted at block 74. This determination can be made using the following equation.

$$\omega c = (\omega r\, Rr/2Rc) + \omega s\, Rs/2Rc \qquad \text{Equation 1}$$

where
  ωc=planetary carrier angular velocity (rad/sec)
  ωr=planetary ring angular velocity (rad/sec)
  ωs=planetary sun angular velocity (rad/sec)
  Rc=planetary carrier radius
  Rr=planetary ring radius
  Rs=planetary sun radius
  angular velocity (rad/sec)=(2)(π)(RPM)/60

Then, as a next step, as denoted at block 76, controller 56 will control pump swash via current to control 40 of pump 38 to achieve the motor speed determined in block 74. This will largely entail controlling pump displacement to bring the planetary ring speed to zero, or some other selected low value. This is achieved by providing resistance to slow the rotation of ring R. When the motor speed for a zero or predetermined low ring speed is achieved, clutch 54 can be engaged to prevent rotation of ring R, as denoted at block 78. Controller 56 will now control motor speed in the same manner, i.e., via pump swash, to slow down sun gear S relative to planets 46 to slow carrier 48 and rotor or rotors 12 until rotation thereof is brought to zero, as denoted at block 80.

Here, it should be noted that a constraint on the counter rotation of motor 34 in both block 74 and block 80 is the maximum safe operating speed thereof. In the instance of many commercially available fluid motors, the maximum speed thereof is typically about 5000 rpm, beyond which damage to the motor and/or drive 36 is more likely to occur. As a result, the determined motor speed value and the motor speed used to bring the rotor to zero should not to exceed the maximum safe operating speed for the motor.

If the drive is in operating state B above, that is, clutch 52 is being slipped and rotor or rotors 12 are accelerating, as denoted at block 82, when the rotor disengage command is received, clutch 52 will be disengaged, as denoted at block 84. Then, if the rotor speed is beyond the speed range of the hydro state, rotor or rotors 12 are passively decelerated until the rotor speed is within the speed range of the hydro state, as denoted at block 86. At this time, or if the passive deceleration is not required, the steps discussed above for the hydro state can be employed, as denoted by blocks 74-80, to decelerate the rotor or rotors to zero.

If when the disengage command is received clutch 52 is fully engaged and the rotor or rotors 12 are completing acceleration or are in the run state, operating state C above, as denoted at block 88, controller 56 will control motor 34 via pump displacement to reduce rotor speed to the minimum speed of the speed range for that operating state, as denoted at block 90. Clutch 52 can then be disengaged, as denoted at block 84. Then, rotor or rotors 12 are passively decelerated, as denoted at block 86 until their speed is within the speed range of the hydro state, as denoted at block 86. Now, the steps discussed above for the hydro state can be employed, as denoted by blocks 74-80, to decelerate the rotor or rotors to zero.

As a result, using the above steps, at any point in the operating state of the drive 8, when a command to disengage the rotor or rotors is received, the rotor or rotors can be decelerated, without shock and high wear, particularly, to clutch 54. Also, the method of the invention is usable with a clutch 54 which is an on/off type clutch, or a slipping type, it being possible to slip clutch 54 as it is being engaged at block 78. Additionally, although the preferred method utilizes a hydrostatic drive in connection with input 30, it should be recognized that other drives can also be used, including but not limited to an electrical motor drive, the electrical motor drive being controllable in an essentially similar manner as fluid motor 34 via electrical current.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of a dual path drive rotatably driving a threshing rotor of an agricultural combine, for decelerating the rotor from a rotating state, comprising the steps of:

(a) providing a planetary gear arrangement having an output connected to the rotor for rotation therewith, a first rotatable input connected in rotatably driven relation to a rotatable output of a variable speed rotatable power source controllably operable by a controller for variably rotating the output thereof, and the gear arrangement including a second input connectable by engagement or operation of a first device in rotatably driven relation to a rotatable output of an engine of the combine, the second input also being connectable by engagement or operation of a second device to a fixed element of the combine so as to be nonrotatable;

(b) after a rotor disengage command is received by the controller, controlling a speed of rotation of the rotatable output of the variable speed rotatable power source to change the rotational speed of the first input such that a rotational speed of the second input is slowed to a speed at which the second device can be engaged or operated for connecting the second input to the fixed element so as to be nonrotatable; then (c) controlling a speed of rotation of the rotatable output of the variable speed rotatable power source to slow a rotational speed of the output of the planetary gear arrangement and the rotor to a desired lower speed.

2. The method of claim 1, where in step (b) before the speed of rotation of the output of the rotatable power source is controlled to slow the rotational speed of the second input, the first device is disengaged or operated to disconnect the second input from the engine.

3. The method of claim 2, further comprising in step (b) after disconnecting the second input from the engine, the step of allowing the rotor to passively decelerate to a speed at which the rotation of the rotatable output of the variable speed rotatable power source can be used to slow the rotational speed of the first input.

4. The method of claim 3, further comprising in step (b) before allowing the rotor to passively decelerate, with the first device connecting the second input to the engine, controlling a speed of rotation of the rotatable output of the variable speed rotatable power source to slow a rotational speed of the output of the planetary gear arrangement and the rotor to a desired lower speed, then disengaging or operating the first device for disconnecting the second input from the engine.

5. The method of claim 1, wherein the second device is a ring-to-frame clutch.

6. The method of claim 1, wherein the first device is an engine-to-ring clutch.

7. The method of claim 1, wherein the variable speed rotatable power source comprises a fluid motor, and in step (b) the controlled speed is less than a maximum speed for the motor.

8. The method of claim 1, wherein the rotatable power source is rotated to bring the speed of the second input to zero prior to connection thereof to the fixed element.

9. The method of claim 1, wherein the rotatable power source comprises an electric motor.

10. The method of claim 1, where in step (b) the controller first determines a speed and direction of rotation of the rotatable power source for changing the rotational speed of the first input such that the rotational speed of the second input is slowed to the speed at which the second device can be engaged or operated for connecting the second input to the fixed element so as to be nonrotatable.

11. The method of claim 9, where in step (b) the rotatable power source is operated for changing the rotational speed of the ring gear.

12. A method of operation of a dual path drive rotatably driving a threshing rotor of an agricultural combine, for decelerating the rotor from a rotating state, comprising the steps of:

(a) providing a planetary gear arrangement having an output connected to the rotor for rotation therewith, a first rotatable input connected in rotatably driven relation to a rotatable output of a variable speed rotatable power source controllably operable by a controller for variably rotating the output thereof, and the gear arrangement including a second input connectable by engagement or operation of a first device in rotatably driven relation to a rotatable output of an engine of the combine, the second input also being connectable by engagement or operation of a second device to a fixed element of the combine so as to be nonrotatable;

(b) after a rotor disengage command is received by the controller, determining a speed of rotation of the rotatable output of the variable speed rotatable power source for changing a rotational speed of the first input for slowing a rotational speed of the second input to a predetermined speed at which the second device can be engaged or operated for fixedly connecting the second input to the fixed element, without exceeding a maximum speed of the power source; then (c) controlling the variable speed rotatable power source to rotate the output thereof at the determined speed to change the rotational speed of the first input so as to slow the rotational speed of the second input to the predetermined speed; then (d) engaging or operating the second device for fixedly connecting the second input to the fixed element; and then (e) controlling the speed of rotation of the rotatable output of the variable speed rotatable power source to slow the rotational speed of the output of the planetary gear arrangement and the rotor to a desired lower speed.

13. The method of claim 12, wherein step (b) includes the further step of disengaging or operating the first device to disconnect the second input from the engine.

14. The method of claim 13, further comprising in step (b) after disconnecting the second input from the engine, the step of allowing the rotor to passively decelerate to a speed at which the rotation of the rotatable output of the variable speed rotatable power source can be used to change the rotational speed of the first input.

15. The method of claim 14, further comprising in step (b) controlling a speed of rotation of the rotatable output of the variable speed rotatable power source to slow a rotational speed of the output of the planetary gear arrangement and the rotor to a desired lower speed, then disengaging or operating the first device for disconnecting the second input from the engine.

16. The method of claim 12, wherein the second device is a ring-to-frame clutch.

17. The method of claim 12, wherein the first device is an engine-to-ring clutch.

18. The method of claim 12, wherein the variable speed rotatable power source comprises a fluid motor, and in step (b) the controlled speed is less than a maximum speed for the motor.

19. A dual path drive for a threshing rotor of an agricultural combine, comprising:

a planetary gear arrangement having an output connected to the rotor for rotation therewith, a first rotatable input, and a second rotatable input;

a variable speed power source having a rotatable output connected to the first rotatable input of the planetary gear arrangement;

a controller operably connected to the variable speed power source for controlling a speed of rotation of the rotatable output thereof;

a first device operable for connecting the second input of the planetary gear arrangement in rotatably driven relation to a rotatable output of an engine of the combine; and a second device operable for connecting the second input of the planetary gear arrangement when rotating at a predetermined speed to a fixed element of the combine so as to be nonrotatable;

wherein when a command to disengage the rotor is received by the controller, the controller will determine a speed of rotation of the rotatable output of the power source for changing a rotational speed of the first input for slowing a rotational speed of the second input to the predetermined speed at which the second device can be operated for fixedly connecting the second input to the fixed element without exceeding a maximum speed of the power source, and then the controller will control the power source to rotate the output thereof at the determined speed to change the rotational speed of the first input so as to slow the rotational speed of the second input to the predetermined speed and then operate the second device for fixedly connecting the second input to the fixed element, then control the speed of rotation of the rotatable output of the power source to slow the rotational speed of the output of the planetary gear arrangement and the rotor to a desired lower speed.

20. The drive of claim 19, wherein the controller is further operable for operating the first device to disconnect the second input from the engine prior to changing the rotational speed of the first input.

21. The drive of claim 20, wherein the controller will change the rotational speed of the first input for slowing a rotational speed of the rotating output prior to operating the first device to disconnect the second input from the engine.

22. The drive of claim 19, wherein the second device is a ring-to-frame clutch.

23. The drive of claim 19, wherein the first device is an engine-to-ring clutch.

24. The drive of claim 19, wherein the variable speed rotatable power source comprises a fluid motor, and the maximum speed is a maximum speed for the motor.

* * * * *